United States Patent [19]

Metoki

[11] Patent Number: 5,148,464
[45] Date of Patent: Sep. 15, 1992

[54] APPARATUS FOR WRITING INFORMATION ON X-RAY FILMS

[75] Inventor: Iku Metoki, Hino, Japan

[73] Assignee: Konica Corporation, Tokyo, Japan

[21] Appl. No.: 625,853

[22] Filed: Dec. 11, 1990

[30] Foreign Application Priority Data

Dec. 11, 1989 [JP] Japan .................................. 1-321098

[51] Int. Cl.⁵ .............................................. H05G 1/28
[52] U.S. Cl. ..................................... 378/165; 378/162; 378/166
[58] Field of Search ............... 378/165, 166, 108, 101, 378/162, 182, 185, 163, 164

[56] References Cited

U.S. PATENT DOCUMENTS

| | | | |
|---|---|---|---|
| 4,194,122 | 3/1980 | Mitchell et al. | 378/165 |
| 4,507,797 | 3/1985 | Kato | 378/165 |
| 4,860,330 | 8/1989 | Strömmer et al. | 378/165 |

*Primary Examiner*—David P. Porta
*Attorney, Agent, or Firm*—Frishauf, Holtz, Goodman & Woodward

[57] ABSTRACT

The improved apparatus for writing information on X-ray films comprising:
means for exposing said X-ray films to write said information,
means for identifying a type of said X-ray films, and
means for adjusting an amount of exposure of said means for exposing in accordance with said means for identifying.

12 Claims, 1 Drawing Sheet

APPARATUS FOR WRITING INFORMATION ON X-RAY FILMS

BACKGROUND OF THE INVENTION

This invention relates to an apparatus for writing information on X ray films. More particularly, this invention relates to an apparatus for writing patient identifying information on X-ray films, with the amount of exposure being properly corrected in accordance with the specific type of X-ray film used.

In order to handle a huge volume of X-ray films taken for many patients, a digital system for storing information in magnetic disks or other media is being developed in the medical field. This offers the advantages of reduced storage space and enabling quick access to the stored information.

Most of the X-ray films handled today have labels attached thereto for indicating the information on individual patients and such patient identifying information is entered as data into computers such as personal computers by authorized operators. This is a separate job from the task of digitizing the image information on X-ray films. Thus, the handling of X-ray films requires at least three operators, one who develops and performs subsequent processing of X-ray films, another who enters patient identifying information as input data, and the third operator who supplies a digitizer with image information specific to the body of a patient.

If patient identifying information that is written on X-ray films either before or after X-ray imaging, can be read and stored simultaneously with the reading of image information specific to the body of an individual patient, then separate personnel for entering the patient identifying information as input data is unnecessary and yet rapid and reliable processing of X-ray films can be accomplished.

In order to insure correct diagnosis, it is common practice in the medical field to perform selective use of X-ray films that have photographic characteristics as appropriate for the specific site of the patient's body. In other words, medical X-ray films are designed in such a way that they have characteristic curves and a sensitivity appropriate for the specific use. On the other hand, patient identifying information is conventionally written on X-rays with a constant amount of exposure. Therefore, the density of patient identifying information often varies from one X-ray film to another. In some X-ray films, the density of such information is too low, and in others, the density is so high that bleeding occasionally occurs which makes correct reading of the information practically impossible.

SUMMARY OF THE INVENTION

This invention has been achieved under these circumstances and has as an object providing an apparatus that identifies the specific type of an X-ray film used and which allows patient identifying information to be written on that X-ray film with the amount of exposure being properly corrected in accordance with the sensitivity of that film.

This object can be attained by an apparatus for writing information on X-ray films comprising:
means for exposing said X-ray films to write said information,
means for identifying a type of said X-ray films, and
means for adjusting an amount of exposure in accordance with said means for identifying.

In accordance with the present invention, the type of an X-ray of interest is first identified and then patient identifying information is automatically written on said X-ray film with an amount of exposure that is appropriate for that particular type of X-ray film. This enables patient identifying information to be appropriately written on various types of X-ray films and said information can be read for storage simultaneously with the reading of patient's body image information from that X-ray film.

DETAILED DESCRIPTION OF THE INVENTION

Figure 1:
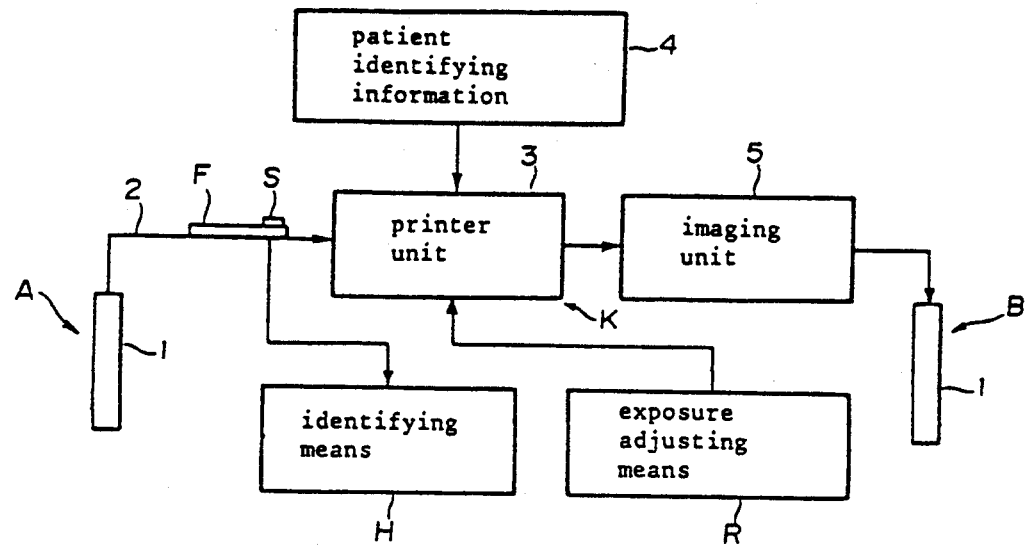
FIG. 1 is a schematic view of an X-ray imaging system that incorporates the concept of the present invention.

The X-ray film imaging system shown in FIG. 1 has a supplier unit A incorporating a film cassette 1 that is loaded with a plurality of unexposed X-ray films. X-ray films F are delivered from the cassette 1 one at a time and guided to travel in a transport path 2. Each of the X-ray films F is tagged with a mark S for identifying the type of that film. The mark S may be provided by cutting a notch in the film.

On the basis of mark S, an identifying means H identifies the type of a particular X-ray film F. In response to the resulting information that identifies the type of the X-ray film of interest, an exposure adjusting means R performs a correction to provide an amount of exposure that is appropriate for the particular film. Using the thus determined amount of exposure, a printer unit 3 which is an image writing means K writes patient identifying information 4 on the X-ray film F. In order to insure correct diagnosis, X-ray films F have photographic characteristics that are appropriate for the specific site of the body of interest. These X-ray film and their characteristic curves and sensitivies are adapted for the specific use of films. Since the system shown in FIG. 1 has means R that performs correction to determine an amount of exposure that is appropriate for a particular film, patient identifying information can appropriately be clearly written on that X-ray film.

The patient identifying information 4 consists of data such as the name, sex and data of birth of the patient, the data of X-ray imaging and the imaging conditions. Such data is typically represented in the form of bar codes but it may be represented by characters, symbols or some other means. The patient identifying information may be indicated in any area along sides of an X-ray film but it is preferably indicated at a corner, say, at the lower right corner. Needless to say, the patient identifying information should not occupy too large a space as to prevent subsequent imaging and it preferably occupies a space not larger than 5 cm × 10 cm.

After the patient identifying information 4 has been written on the X-ray film F, an X-ray picture of a specific site of the patient's body is taken in an imaging unit 5. After this imaging step is completed, the X-ray film F is transferred to a receiving unit B where it is reloaded in the film cassette 1. If desired, the printer unit 3 may be provided in a stage subsequent to the imaging unit 5 so that patient identifying information 4 is written after X-ray imaging.

The cassette loaded with exposed X-ray films is set in a photographic processor where it is developed by passage through a developing tank, a fixing tank, a drying zone, etc. to obtain both patient's body image information and patient identifying information.

As above mentioned, patient identifying information 4 is typically written in the form of bar codes but, alternatively, it may be recorded in a binary (black and white) code pattern or recorded magnetically using a magnetic coating on the X-ray films.

The method of recording in a binary code pattern consists of forming two levels of binary code by dividing a frame into two independently readable density areas (black and white areas) and combining those codes in various patterns to represent patient identifying information. The thus represented binary code pattern is read in the identifying unit by means of an optical code reader.

The method of magnetic recording using a magnetic coating on an X-ray film consists of providing a magnetic coating on the X-ray film (for example, on a side of the film where a notch is cut) and magnetically writing patient identifying information in a printer unit having a magnetic head. The thus written patient identifying information is read in the identifying unit by means of a magnetic reader.

Figure 2:
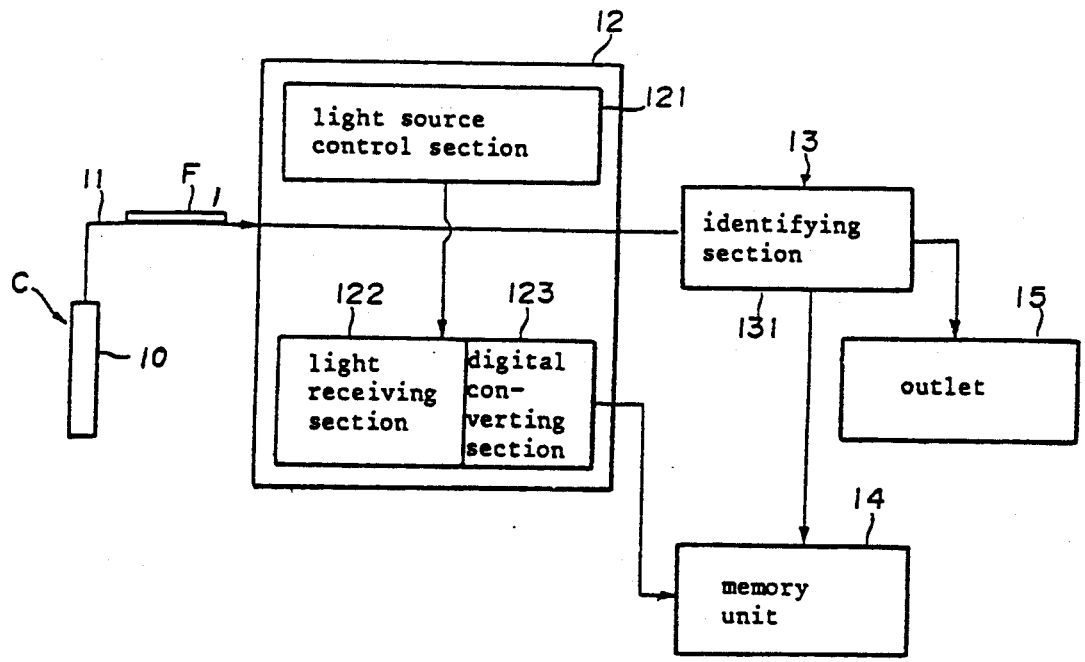
FIG. 2 is a schematic view of an X-ray film information processor.

The X-ray film information processor shown in FIG. 2 has a film cassette 10 set in a film cassette setting unit C. A plurality of X-ray films F are accommodated within the film cassette 10; the X-ray films have been developed and carry both patient's body image information and patient identifying information.

The X-ray films F are successively passed through a transport path 11 into a patient's body image information processing unit 12 and a patient's identifying information processing unit 13. The patient's body image information processing unit 12 comprises a light source control section 121 for controlling the emission of laser light, a light-receiving section 122 for receiving the laser light emitted from the light source control section 121, and a digital converting section 123 for performing photoelectric conversion on the transmitted light from the X-ray films F. The section 12 reads the patient's body image information recorded on the X-ray films F and stores the readout as a digital signal in a memory unit 14. The patient identifying information processing unit 13 has an identifying section 131 and reads the patient identifying information recorded on the X-ray filsm F, with the readout being stored in the memory unit 14 in correspondence to the patient's body image information. In the case where the patient identifying information is represented in one or more bar codes, the identifying section 131 is composed of a bar code reader. In the case where the patient identifying information is represented in characters or symbols, it is read in the patient's body image information processing unit 12 and stored in the memory unit 14 after conversion to a digital signal. If desired, the patient identifying information may be read simultaneously with the patient's body image information in the processing unit 12 and stored in the form of a digital signal. This embodiment has the advantage that the identifying section 131 need not be provided. The processed X-ray films F are passed through the transport path 11, delivered from an outlet 15 and subsequently used for diagnostic purposes.

The memory unit 14 is built in the system. Alternatively, an external memory unit may be used. The memory unit 14 typically is in the form of an optical or magnetic disk.

The embodiment described above refers to the case of using only one film cassette 10. If desired, more than one film cassette may be loaded in the system so that following the completion of the processing of one film cassette, other film cassettes are subjected to the same processing in a preset order. In either event, when the operator loads one or more film cassettes 10 in the system, all the patient-related information is automatically read from the developed X-ray films and stored in the system.

Conventionally, X-ray films are supplied and otherwise handled manually by operators and this has often been the cause of fouling or damaging the X-ray films. This problem is entirely absent from the present invention. Further, multiple X-ray films can be processed without error. As a result, the apparatus of the present invention can be operated efficiently to insure rapid and reliable processing of X-ray films.

In another embodiment of the present invention, the image processor shown in FIG. 2 may be integrated into a developing system to develop and process X-ray films in a continuous manner.

In accordance with the present invention, the type of an X-ray film of interest is first identified and then patient identifying information is automatically written on said X-ray film with an amount of exposure that is appropriate for that particular type of X-ray film. This enables patient identifying information to be appropriately written on various types of X-ray films and said information can be read for storage simultaneously with the reading of patient's body image information from that X-ray film. Thus, both a patient's body image information and patient identifying information can be recorded on X-ray films in a simple and a most labor-saving manner.

What is claimed is:

1. An apparatus for writing desired information on a plurality of X-ray films having different photographic exposure characteristics, comprising:
   identification means for automatically identifying a photographic exposure characteristic of each of said plurality of X-ray films;
   controllable writing means for writing desired information on a predetermined portion of a selected one of said X-ray films by exposing said predetermined portion of said selected one of said X-ray films to energy source means including said information; and
   adjusting means for adjusting the controllable writing means to control the exposing of the selected one of said plurality of X-ray films based on the identified exposure characteristic of the selected one of said X-ray films by said identification means so that the desired information written on each of said plurality of X-ray films is controlled to be within a predetermined machine readable range, thereby facilitating reading, storage and retrieval of said X-ray films having said desired information thereon.

2. The apparatus of claim 1 wherein said writing means comprises a printer unit.

3. The apparatus of claim 1, wherein:
   said writing means writes information on the selected one of said X-ray films in the form of a bar code.

4. The apparatus of claim 1, wherein:
said writing means writes information on the selected one of said X-ray films in the form of a binary code pattern.

5. An apparatus for writing an identification information on a plurality of X-ray films having different photographic exposure characteristics, comprising:
controllable writing means for writing the identification information on said X-ray films by controllably exposing said X-ray films to energy source means including said identification information;
automatic identification means for identifying the photographic exposure characteristics of said plurality of X-ray films; and
adjusting means for adjusting the controllable writing means to expose the selected ones of said X-ray films to said energy source means in accordance with the identification of the photographic exposure characteristics of the selected ones of said X-ray films by said identification means so that the identification information written on each of said plurality of X-ray films is controlled to be within a predetermined machine readable range, thereby facilitating reading, storage and retrieval of said X-ray films having said identification information thereon.

6. The apparatus of claim 5, wherein:
said writing means comprises a printer unit.

7. The apparatus of claim 5, wherein:
said writing means writes information on the selected ones of said X-ray films in the form of a bar code.

8. The apparatus of claim 5, wherein:
said writing means writes information on the selected ones of said X-ray films in the form of a binary code pattern.

9. A method for writing desired information onto a plurality of X-ray films respectively having different photographic exposure characteristics, comprising:
automatically identifying the radiation exposure characteristic of each of said plurality of X-ray films;
controllably writing said desired information onto a selected one of said plurality of X-ray films by exposing said selected one of said X-ray films to an energy source means including said desired information; and
adjusting the controllable writing of said desired information onto said selected one of said X-ray films by adjusting the exposure of said selected one of said plurality of X-ray films to said energy source means in accordance with the identified exposure characteristic of said selected one of said plurality of X-ray films so that said desired information is written onto said selected one of said X-ray films to fall within a predetermined machine readable range thereby facilitating reading storage and retrieval of said selected one of said X-ray films having said desired information therein.

10. The method of claim 9, further comprising:
writing said desired information on said selected one of said X-ray films in the form of a bar code.

11. The method of claim 9, further comprising:
writing said desired information on said selected one of said X-rays films in the form of a binary code.

12. The method of claim 9, further comprising:
writing said information on said selected one of said X-ray films using a printer unit.

* * * * *